(12) United States Patent
Davydov

(10) Patent No.: US 7,707,291 B2
(45) Date of Patent: Apr. 27, 2010

(54) HANDLING INCOMING DATA

(75) Inventor: Alexander Davydov, Tampere (FI)

(73) Assignee: Nokia Corporation, Espoo (FI)

(*) Notice: Subject to any disclaimer, the term of this patent is extended or adjusted under 35 U.S.C. 154(b) by 1426 days.

(21) Appl. No.: 11/048,081

(22) Filed: Feb. 1, 2005

(65) Prior Publication Data

US 2006/0171383 A1    Aug. 3, 2006

(51) Int. Cl.
G06F 15/16    (2006.01)
(52) U.S. Cl. .................. 709/227; 709/200
(58) Field of Classification Search ............ 709/220, 709/227
See application file for complete search history.

(56) References Cited

U.S. PATENT DOCUMENTS

| | | | | |
|---|---|---|---|---|
| 5,742,823 | A * | 4/1998 | Edwards et al. ............. | 718/102 |
| 7,092,703 | B1 * | 8/2006 | Papineau ................... | 455/418 |
| 7,159,030 | B1 * | 1/2007 | Elzur ........................ | 709/238 |
| 2003/0068025 | A1 * | 4/2003 | Wengrovitz et al. ..... | 379/115.01 |
| 2004/0047361 | A1 * | 3/2004 | Fan et al. .................. | 370/411 |
| 2004/0186918 | A1 | 9/2004 | Lonnfors | |
| 2004/0255008 | A1 | 12/2004 | Olsen et al. | |

FOREIGN PATENT DOCUMENTS

GB    2348088    9/2000

OTHER PUBLICATIONS

Klingsheim, J2ME Bluetooth Programming, Jun. 30, 2004.*

* cited by examiner

Primary Examiner—Nathan Flynn
Assistant Examiner—James E Conaway
(74) Attorney, Agent, or Firm—Hollingsworth & Funk, LLC

(57) ABSTRACT

So-called push technology enables reception of new contents automatically, i.e. without user initiation. In order to enable a connecting party to send data when a receiving application is not even running, and thus cannot receive the data, middleware simulating the application to a connecting party, and an active connection to the application by utilizing buffers is provided. More precisely, the middleware is arranged to buffer incoming data on behalf of the application, if the application is not receiving the data, and to allow the application to receive the buffered data when the application is again willing to receive the data.

18 Claims, 6 Drawing Sheets

HANDLING INCOMING DATA

FIELD OF THE INVENTION

The present invention relates to handling incoming data, and particularly to buffering incoming data when an application to which the data is targeted is not active or not receiving the data for other reasons.

BACKGROUND OF THE INVENTION

The evolvement of communication technology and user terminals has enabled versatile communication possibilities. The number of procedures to be carried out by a wireless terminal device, such as a mobile station or a personal digital assistant (PDA), has increased considerably as a result of advances in mobile communication technology. For example, a mobile station is no longer used for calls exclusively, but the mobile station enables information to be processed and presented in a more and more versatile manner.

Different software applications for versatile communications have also evolved alongside. The introduction of hardware and software independent wireless Java programming language, and especially J2ME (Java 2 Platform, Micro Edition) technology, which is suitable for the range of extremely tiny commodities such as smart cards or a pager all the way up to the appliances as powerful as a computer, has accelerated the usage of web services via different applications called MIDlets. The MIDlets are applications designed to run on wireless Java-enabled devices, and they can access objects across the Internet via URL (Uniform Resource Locator) addresses as easily as on a local file system. Usually, the MIDlets conform to Mobile Information Device Profile (MIDP) specification that specifies the architecture and the associated application programming interfaces (API) required for enabling an open third-party application development environment for mobile information devices. The MIDP, combined with a connected limited device configuration (CLDC), is the Java runtime environment for today's compact mobile information devices.

The MIDP 1.0 specified only one way to start a MIDlet: manual activation by the user. This lack of choices limited the range of services that a MIDlet could provide; in particular, there was no way to receive new contents automatically. To overcome this, the MIDP 2.0 specification introduced two new mechanisms to launch a MIDlet: in response to an incoming connection or at a scheduled time, i.e. without user initiation. These mechanisms make whole new classes of services possible by enabling receiving and acting on data asynchronously. The new mechanisms utilize an application management system AMS, in Java environment also called JAM, which is responsible for each application's life-cycle (installation, activation, execution, and removal), and especially a component called Push Registry in the AMS. When a MIDlet is active (running), the MIDlet itself is responsible for all communication events, such as setting up and monitoring inbound connections. When a MIDlet is not active, it can request the AMS to monitor inbound connections on behalf of the MIDlet and when an inbound connection occurs, the AMS activates the MIDlet to handle the inbound connection.

In MIDP, inbound connections may be message-based, such as short messages, stream-based, such as a TCP socket, or packet-based, such as a datagram. The message-based inbound connections may buffer a pushed message. However, when an inbound connection is not message-based the MIDlet must open the connection promptly because a connecting party may start sending data immediately after the connection has been set up. One of the problems associated with the above arrangement is that it may take some time before the MIDlet is actually auto-launched and able to start to communicate with the connecting party, only after which data can be received. The delay may be quite significant, especially if a user approval is needed to auto-launch the MIDlet. Situations may then exist in which the connecting party starts to send data although the receiving MIDlet is not yet running, and thus cannot receive the data.

BRIEF DESCRIPTION OF THE INVENTION

An object of the present invention is to provide a method and an apparatus for implementing the method so as to overcome the above problem. The object of the invention is achieved by a method, an electronic device, a system, and a computer program product that are characterized by what is stated in the independent claims. Preferred embodiments of the invention are disclosed in the dependent claims.

The invention is based on the idea of realizing the above problem and providing a mechanism for allowing incoming data to be received and stored in corresponding buffer(s) when the targeted application is not running or not receiving for other reasons the data at the time the data begins to come in, and to enable the application to read the received data from the buffer(s) even when the connection via which the data was received no longer exists. In other words, the invention is based on middleware between the actual application and operating system, the middleware simulating the actual software to the connecting party, and an active connection to the actual software by utilizing buffers.

An advantage of the above aspect of the invention is that if the receiving application is not launched in time, data is not lost but the application can recover the data, even if the connection is lost. Another advantage is that the connecting party can start sending data immediately after the connection has been established, regardless of whether or not the application is already running.

BRIEF DESCRIPTION OF THE DRAWINGS

In the following, the invention will be described in greater detail by means of exemplary embodiments and with reference to the accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is made to the same embodiment(s), or that a particular feature only applies to a single embodiment.

The present invention is applicable virtually to any communications environment in which applications need to be started in response to incoming connections. The communications environment may be based on a fixed communications system and/or a wireless communications system and it may be even within a communications device. Applications, communications systems, environments, and devices, such as terminals, especially in wireless communications, develop rapidly. Such development may require extra changes to the invention. Therefore, all words and expressions should be interpreted broadly, and they are intended to illustrate, not to restrict the invention.

In the following, the present invention is described using, as an example of a system environment whereto the present invention may be applied, an environment relying on J2ME interfacing a CLDC virtual machine environment, wherein Bluetooth API is utilized, without restricting the invention thereto; the invention is programming language independent, as well as environment and API independent. It should be appreciated that the environments and the transmission methods used are irrelevant to the actual invention. Therefore, they need not to be discussed in more detail here. The present invention primarily relates to buffering incoming data on behalf of a target application that was either not active or not willing to receive the data at the moment when the data began to come in. In this respect, the applications have a first mode in which the application is receiving data and a second mode in which the application is not receiving data.

Figure 1:
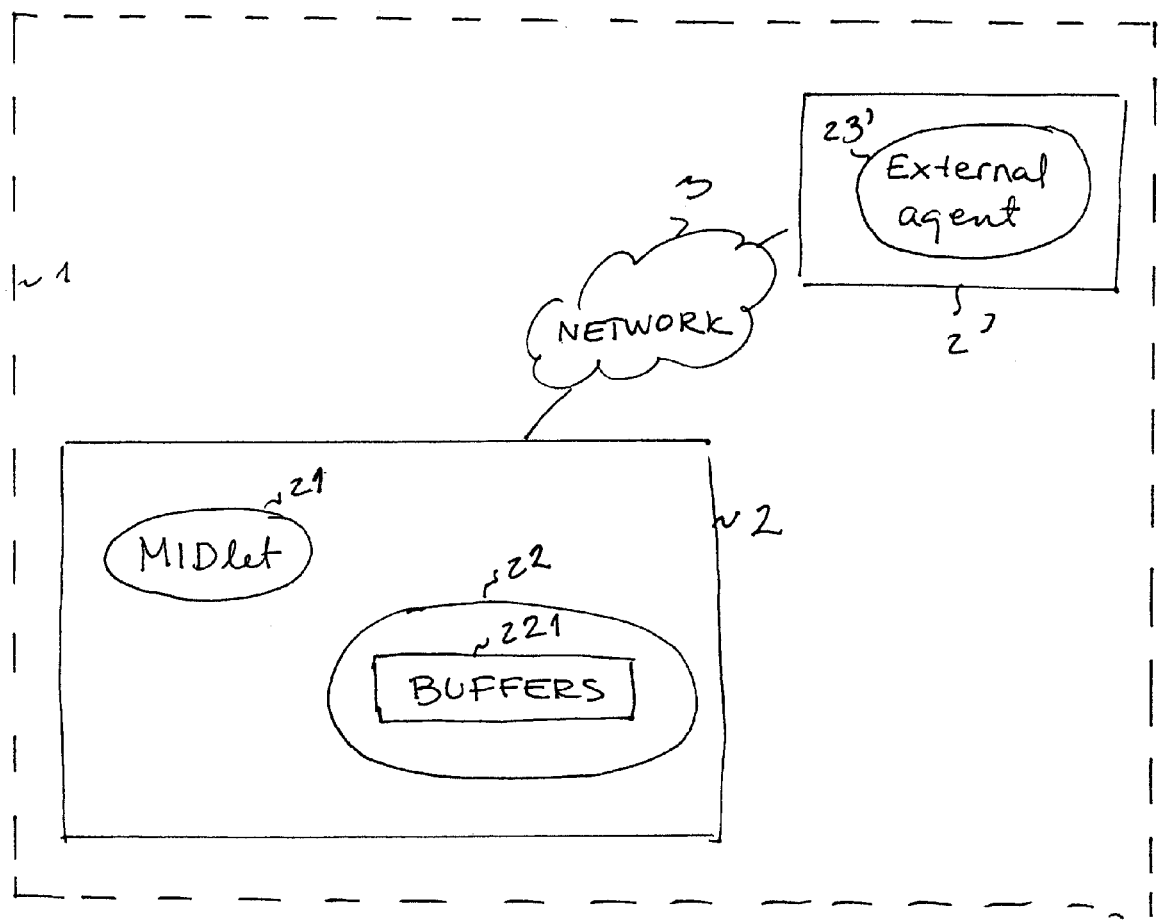
FIG. 1 is a block diagram illustrating an example of a device and a system according to an embodiment of the invention.

FIG. 1 shows a very simplified system architecture only comprising a communications system 1, two devices 2, 2' and a network 3. It is apparent to a person skilled in the art that the system also comprises other devices, system entities, functions and structures that need not be described in detail herein.

A device 2 may be a user terminal or another piece of equipment that supports push technology principles and allows an application to be launched in response to an inbound connection to the application. The push technology principles mean that information may be sent to a target application/device without a separate request by the target application/device/user of the device. To support the push, the device must support one or more inbound connection types, such as socket, datagram or wireless messaging API (WMA), an example of the latter one being SMS (Short Message sage Service) messages. Thus, the device 2 may be any node or a host, providing data transmission and/or data and reception preferably capable of communicating over a network and/or with a network (if necessary). The device 2 may be a non-mobile apparatus, such as personal computer PC or a server, connectable to the network 3 wirelessly or via a fixed connection. The device 2 may also be a wireless mobile apparatus, such as a mobile terminal or a PDA. The device is preferably a multi-service device capable of running multiple applications that are able to receive incoming data from several devices, even simultaneously, via a network interface, for example. Such devices are illustrated in US patent application publication US 2004/0186918 A1, which is incorporated herein by reference. However, the invention is also applicable to devices capable of running one application that supports the push technology and may receive data only from one connecting party at a time.

In the example of FIG. 1, the data receiving device 2 comprises one or more applications herein called MIDlets, 21 and an application management system AMS 22, or JAM in a Java environment, and a connecting party, i.e. data sending device 2' comprises an external agent 23'. An agent here covers a remote application, a connecting application, and as well as the part of the system/device that performs information preparation and exchange on behalf of a client or server application in the client-server model. Thus, the external agent is responsible for initiation of inbound connections, among other things. However, it bears no significance to the invention how the connecting party, i.e. the external agent, is implemented and what features the connecting party contains. In some other embodiment of the invention, the sending external agent 23' may locate in the same device as the receiving party. In other words, a device may comprise the agent, the MIDlet and the AMS, in which case the agent is external to the MIDlet. Naturally, one device may be a sending device to a party and a receiving device to another party.

The AMS 22 is, as described above, middleware that knows how to load MIDlets, where to store them, and how the user can launch them and for a closed MIDlet whether or not there are any connecting parties waiting for a MIDlet launching. A component of the AMS called Push Registry (not shown in FIG. 1) is in the MIDP 2.0 the component that exposes the push API and keeps track on push registrations, i.e. on connection endpoints registered by MIDlets (below also referred to simply as endpoints). Since the division of functions between the Push Registry and the AMS is rather artificial and implementation dependent, the AMS is herein used as also covering the Push Registry, and no division of functions is performed for the sake of clarity. The AMS, or the push registry of the AMS, according to the invention comprises one or more buffers 221 for inbound connections. Preferably, a separate data buffer exists or is allocated from a memory in response to an inbound connection to an endpoint (i.e. for each separate external agent/remote device sending data to a certain endpoint), the buffers being maintained endpoint-specifically. The invention does not restrict the number of buffers for one end-point. Furthermore, the buffer size and actions to be taken when the buffer overflows depend on the implementation. However, the buffering technique used bears no significance to the invention. For example, incoming data may be stored in a common buffer as long as from point of view of the MIDlets the data received from an external agent is separate from data received from another external agent, and that the data can be dispatched to a proper MIDlet.

It is apparent to a person skilled in the art that the device may also comprise other entities, functions and structures that need not be described in detail herein. Examples of these include processor(s), memory, input/output bus, different user interfaces, different APIs, network interfaces, a dispatcher with registry to oversee incoming data, as disclosed in the above mentioned US patent application publication US 2004/0186918 A1, etc.

In the example illustrated in FIG. 1, the network providing the connection between the sending device 2' and the receiving device 2 is based on the Bluetooth Wireless Technology. However, the network may be some other near field wireless communication network, such as ultrawideband, Zigbee, IrDA (Infrared Data Association) based data transmission network, a WLAN (Wireless Local Area Network), or any other network implemented using wired or wireless data transmission technology. Wireless data transmission technology herein refers to any system that enables wireless data transmission to mobile terminals within the service area of the system. The system may also be GSM (Global System for Mobile Communications), GPRS (General Packet Radio Service), UMTS (Universal Mobile Telecommunications System), or any other corresponding mobile system. The network may also be a fixed network. It should be appreciated that the network bears no significance to the invention, and in some embodiments no network is needed because information exchange occurs within a device.

Figure 2:
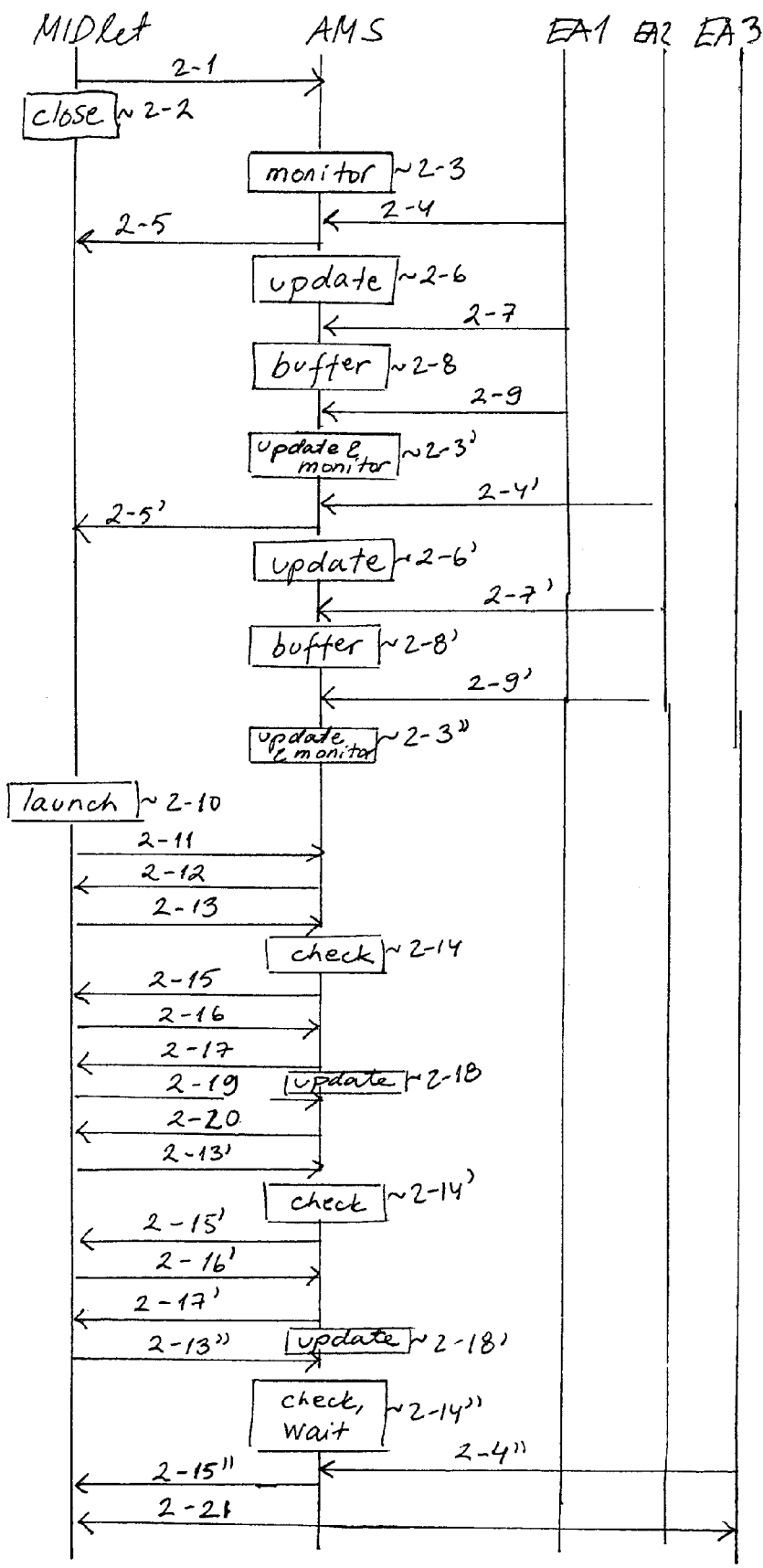
FIG. 2 is a sequence diagram illustrating functionality according to an exemplary embodiment of the invention.
Figure 3:
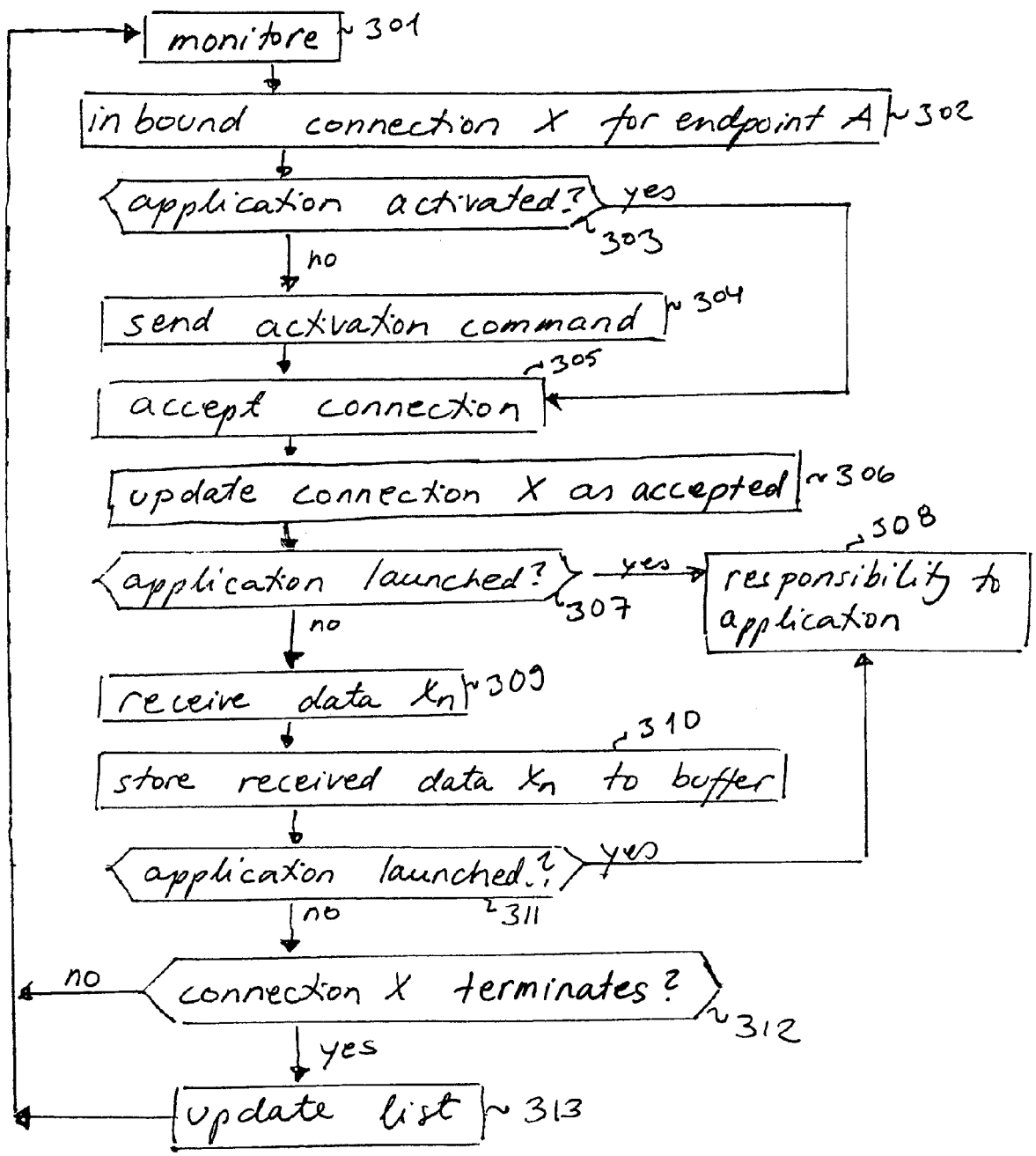
FIGS. 3 and 4 are flow charts depicting simulation according to an embodiment of the invention.
Figure 4:
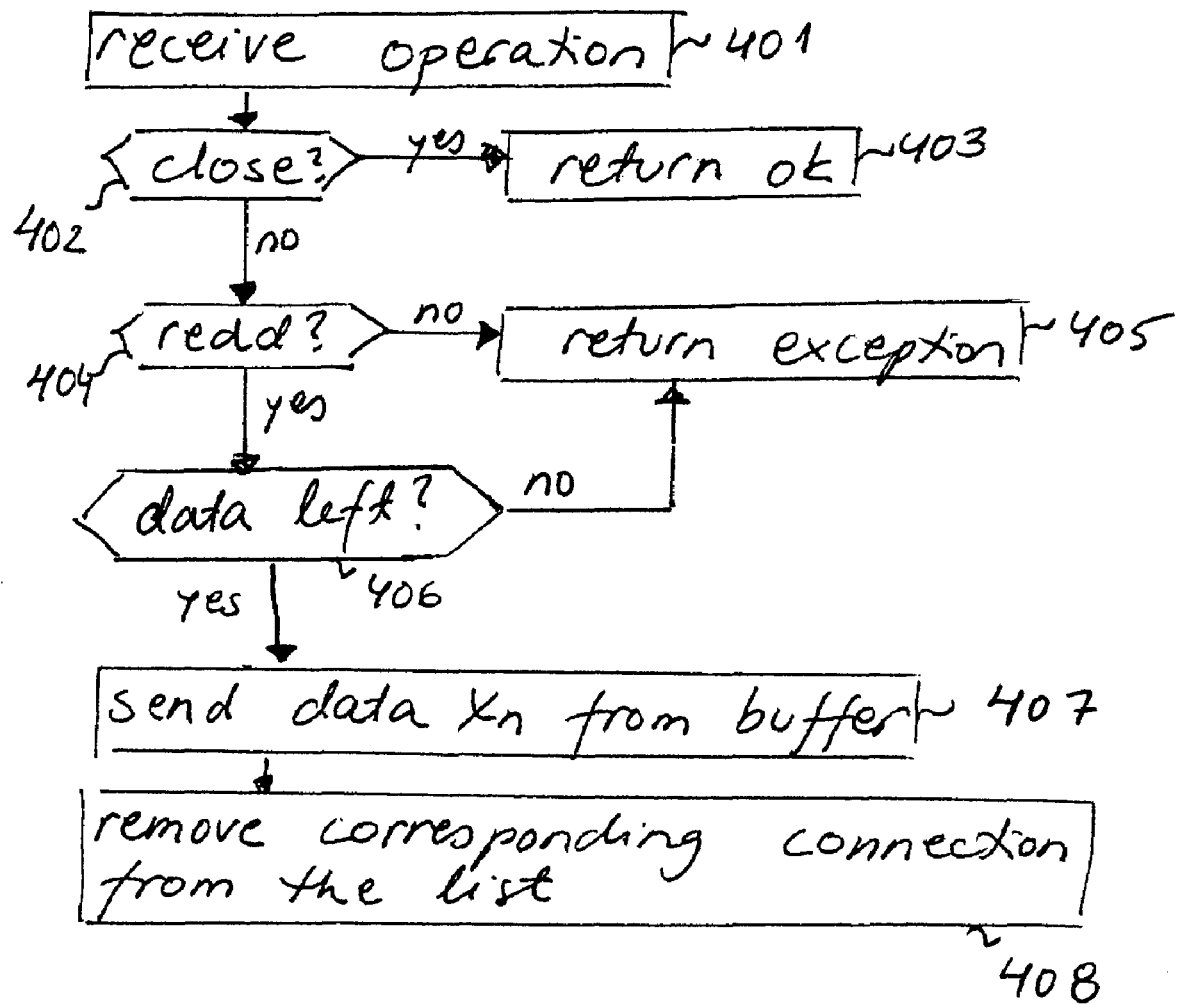

In the embodiments illustrated with FIGS. 2 to 4, it is assumed that the AMS maintains a list of inbound connections that the AMS accepted during the time the MIDlet was not running, the list also indicating whether the inbound connection is still active or disconnected (i.e. lost). However, it bears no significance to the invention how the necessary information is maintained.

FIG. 2 is a sequence diagram illustrating functionality according to an embodiment of the invention. More precisely, FIG. 2 illustrates how the AMS simulates an active MIDlet to the sending party and an active connection to the MIDlet. In MIDP 2.0 the responsibility for push connections is shared between the MIDlet and the AMS. To become push-enabled, the MIDlet has to register itself with the AMS for connections to a certain, and more precisely, with the Push Registry, with certain attributes, including allowed senders. In the example of FIG. 2, it is assumed, for the sake of clarity, that the inbound connections are accepted, inbound connections occur successive, and the MIDlet registers only one endpoint.

In the sequence diagram of FIG. 2, the MIDlet registers itself for connections to the endpoint, by sending operation 2-1 (Register Connection) to the AMS, whereafter the MIDlet closes, in point 2-2. Because of the registration and the MIDlet closing, the AMS starts to monitor, in point 2-3, connection attempts on behalf of the MIDlet. In other words, the AMS listens to data connections to the registered endpoint When an external agent EA1, such as the device 1, sends operation 2-4 (connect) to the MIDlet in order to send data, for example, the AMS accepts the connection (not shown in Figure) and sends operation 2-5 (activate MIDlet) in order to auto-launch the closed MIDlet and, depending on the implementation, may prompt the user about the auto-launch and even request permission to auto-launch. Furthermore, the AMS updates the inbound connection as accepted, in point 2-6, in the list. Since the external agent EA1 assumes that the MIDlet is running, it sends data, in operation 2-7, to the MIDlet although the MIDlet has not yet been launched. The AMS buffers, in point 2-8, the received data. In other words, the AMS allocates a buffer from the memory specifically for this connection and stores the data in the allocated buffer. When the external agent EA1 has nothing more to send, it disconnects (operation 2-9), (or the connection is lost due to other reasons, such as the device 1 moving out of the Bluetooth range) and the AMS updates the list about this accepted connection being closed but some data being stored in the buffer, and continues to monitor, in point 2-13, communication events on behalf of the MIDlet.

Then another external agent EA2, such as the device 2, sends operation 2-4' (connect) to the (same) MIDlet. This may occur parallel or overlapping with the above-described communication of the external agent EA1, provided that the receiving device supports parallel inbound connections. However, in this example they are successive connections. In response to operation 2-4', the AMS accepts the connection and sends operation 2-5' (activate MIDlet) in order to auto-launch the MIDlet and, depending on the implementation, may prompt the user about the auto-launch and even request permission to auto-launch. The AMS also updates, in point 2-6', the list about inbound connection now being an accepted connection. Since the external agent EA2 also assumes that the MIDlet is running, it also sends data, in operation 2-7', to the MIDlet although the MIDlet has not been launched yet. The AMS, according to the invention, buffers, in point 2-8', the received data. For buffering this received data, the AMS preferably allocates a second buffer in which the data is stored. When the external agent EA2 has nothing more to send, it disconnects (operation 2-9'), and the AMS updates the list about this accepted connection being closed, and continues to monitor, in point 2-3", communication events on behalf of the MIDlet. Another reason for the disconnection may be that the device 2 moved out of the Bluetooth range, for example.

In some other embodiment of the invention, no operation 2-5' is sent, i.e. no attempt to auto-launch a MIDlet having a pending auto-launch request is made twice. However, if the user is prompted about the auto-launch, the prompt is still preferably modified to indicate that another inbound connection has been initiated.

Then the MIDlet is finally launched, in point 2-10, and the monitoring of incoming connection attempts reverses to the responsibility of the MIDlet. The MIDlet then attempts to open all its registered connection end-points, i.e. in this example, the connection corresponding to the only registered endpoint, and sends operation 2-11 (notifier=Connector open( )) to the AMS. The AMS recognizes that the MIDlet wishes to open the connection corresponding to a registered endpoint and returns the appropriate connection object. The MIDlet then tries to open the connection by sending operation 2-13 (connection=notifier.acceptAndOpen( )). In response to receiving that, the AMS checks, in point 2-14, the contents of the list. In other words, the AMS checks if there are any accepted connections to this registered endpoint or if there is any data buffered for this endpoint. Now the list shows two accepted closed connections, thereby indicating that there is data received from two external agents in the buffers, and the AMS sends operation 2-15 (i.e. immediately returns the first accepted connection, as if it were still active. The MIDlet then sends operation 2-16 (read( )) to read the buffered data. The buffered data in the first buffer is read (2-17) and the AMS removes, in point 2-18, the connection relating to the first buffer from the list. The MIDlet then wishes to answer or perform any other operation on the first connection, and sends operation (2-19) targeted to the external agent 1. Since the inbound connection does no longer exists, the AMS returns an exception 2-20, which tells the MIDlet that the connection is no longer active.

The MIDlet then closes the connection (not shown in FIG. 2) and performs the same open, read and close operations on the second connection. In other words, the MIDlet opens the second connection by sending operation 2-13' (connection=notifier.acceptAndOpen). In response to receiving that, the AMS checks, in point 2-14', the list, as explained above. Now, because the list indicates that data received from the external agent 2 is in the buffer, the AMS sends operation 2-15', i.e. immediately returns the second accepted connection, as if it were still active. The MIDlet then sends operation 2-16' (read( )) to read the buffered data. The buffered data in the second buffer is read (2-17') and the corresponding connection is removed (2-18') from the list. Next, the MIDlet closes this connection (not shown in FIG. 2).

The MIDlet then tries to open another connection and sends operation 2-13" (connection=notifier.acceptAndOpen) . In response to receiving that, the AMS checks, in point 2-14", the contents of the list as described above, i.e. the AMS checks whether there are any accepted connections to this endpoint or whether any data is buffered for this endpoint. Now the list is empty, indicating that there are no active connections and no buffered data, and the operation acceptAndOpen( ) blocks until a remote device connects. In this example, an external agent EA3 connects, and acceptAndOpen( ) returns (operation 2-15") and MIDlet can start communicating (2-21) directly with the EA3.

If the connection with the EA1 would have been alive when the MIDlet sent operation 2-13

(connection=notifier.acceptAndOpen( )), the MIDlet could have started to communicate with the remote device. The same applies to the connection with the EA2.

In another embodiment of the invention, the AMS may, in response to a buffer relating to a lost connection being read, send the MIDlet an exception or any notification to indicate to the MIDlet to close, i.e. send operation 2-13'. In a further embodiment of the invention, the AMS may send the exception or a corresponding notification only after all buffered data has been read.

As can be seen from the above, the MIDlet is able to read the data from external agents (for example, two different remote devices, or from two different connections from the same remote device) even after the connections are lost, although the MIDlet performs exactly the same functions as it would have performed in a situation in which the MIDlet would have been running when inbound connections occurred and data were sent. In other words, all the MIDlet has to do is to open all its registered connection end-points. Herein, attempts to open the inbound connections that are still active or those that were lost but contained some data will succeed (i.e. the MIDlet will open these connections), other attempts will block (i.e. the MIDlet will be blocked in waiting for new incoming connections). If the opened connection is in fact a lost one, an exception is thrown once the MIDlet reads the buffered data. After getting this exception, the MIDlet will immediately try to close the connection and to open the same connection again. If there is another lost inbound connection with data on the same endpoint, the MIDlet will again read the data, receive an exception, close the connection, and try to open the connection again, etc., until the MIDlet will be blocked in waiting for a new connection.

As is apparent from the above, the present invention also provides a solution to a problem as how to deliver data received from different connecting parties to a MIDlet when it is finally launched, when a communication protocol used allows several connecting parties to connect and send some data to the same end-point before a MIDlet is auto-launched and able to receive data. Furthermore, it is apparent from the above that although the invention is applicable to all types of inbound connections, it is especially suitable for end-to-end-orientated connections, i.e. for non-messaging-based connections.

FIG. 3 is a flowchart illustrating how the AMS simulates a running MIDlet to an external agent according to an embodiment of the invention In FIG. 3 it is also assumed, for the sake of clarity, that all inbound connections are acceptable. FIG. 3 starts when a MIDlet is closed and the AMS monitors, in step 301, communication events, among other things. The AMS notices, in step 302, an inbound connection X for endpoint A, i.e. a connection targeted to the MIDlet that has registered for connections to endpoint A. The AMS then checks, in step 303, whether or not the MIDlet has been activated, i.e. whether or not an auto-launch command has been sent to the MIDlet. If the auto-launch command has not been sent yet, it is sent, in step 304, after which the connection X is accepted, in step 305, and updated, in step 306, in the list as an accepted connection. If the auto-launch command has been sent (step 303), the auto-launch command is not sent again but the AMS proceeds directly to step of accepting the connection (step 305).

If the MIDlet has been launched (step 307), i.e. it has moved to an active state, is running, and has opened the registered endpoint, the inbound connection X is returned to the MIDlet and the MIDlet is now responsible for the inbound connection X (step 308).

If the application has not been launched (step 307), and data Xn is received over the connection (step 309), the AMS stores, in step 310, the received data Xn to a first empty buffer for endpoint A as long as the data comes in.

If the MIDlet is not launched (i.e. has not opened the registered endpoint) during the data reception (step 311), and the inbound connection X is not terminated (step 312), the AMS continues the monitoring and repeating the above steps, or some of them, as many times as necessary until the MIDlet is launched after which the MIDlet starts to monitor inbound connections, possible retrieve data from the buffers, as explained above in connection with FIG. 2 and will be discussed in more detail in connection with FIG. 4.

If the inbound connection X is terminated (step 312), the AMS updates, in step 313, the list about the inbound connection X being a closed connection with data available, as described above with FIG. 2. The AMS then continues the monitoring and repeating the steps as discussed above.

Although not shown in FIG. 3 for the sake of clarity, when the MIDlet is closed again or uninstalled, or the MIDlet's ability to receive data sent without a request from the external agent is disabled by the MIDlet closing the connection or removing the endpoint from the registered ones, or the MiDlet launch is disapproved of, or the device containing the MiDlet is switched off, the AMS preferably empties buffers containing data for this endpoint, or for all endpoints registered by the uninstalled MIDlet. Thus, if the MIDlet quits without reading the buffered data, the data buffered for the MIDlet is preferably lost. The fact that the data is not read indicates that the MIDlet is not interested in the data, and the data is thus not buffered in vain.

FIG. 4 is a flow chart illustrating an example of how the AMS simulates an accepted but closed connection with available data as an active connection to a MIDlet. In the example of FIG. 4, it is assumed that buffering is performed inbound connection specifically. The situation in FIG. 4 starts after the MIDlet has opened a lost connection (with available data) to endpoint A, i.e. after operations in 2-13 and 2-15 in FIG. 2. When the AMS receives from the MIDlet an operation relating to this lost connection to endpoint A (step 401), the AMS checks, in step 402, whether or not the operation was a "close" one (i.e. an operation to close a connection the MIDlet assumes is active). If it was a "close" one, the AMS returns, in step 403, an acknowledgement indicating that the connection was closed. Since the connection was already closed, no further functions are required. If it was not a "close", the AMS checks, in step 404, whether or not the operation was "read". If it was not "read", the AMS returns, in step 405, an exception.

If the operation was "read" one (step 404), the AMS checks, in step 406, whether or not there is any buffered data for endpoint A. If all the buffered data has already been read (step 406), the AMS returns, in step 405, an exception. If there still is buffered data, the AMS sends, in step 407, data Xn from the buffer to which the data send over inbound connection X was buffered. While the data is read/send, the corresponding buffer is emptied. This way it is ensured that the data is stored and read according to FIFO (first in first out) principles. After a closed inbound connection has been simulated to be active, and the relating data is read, the inbound connection is then removed, in step 408, from the list. (There is no reason why the connection should be on the list of accepted connections any more.)

It is apparent from the above that the MIDlet is able to access data sent to it while the MIDlet was not active by looping and reading the data.

Figure 5:
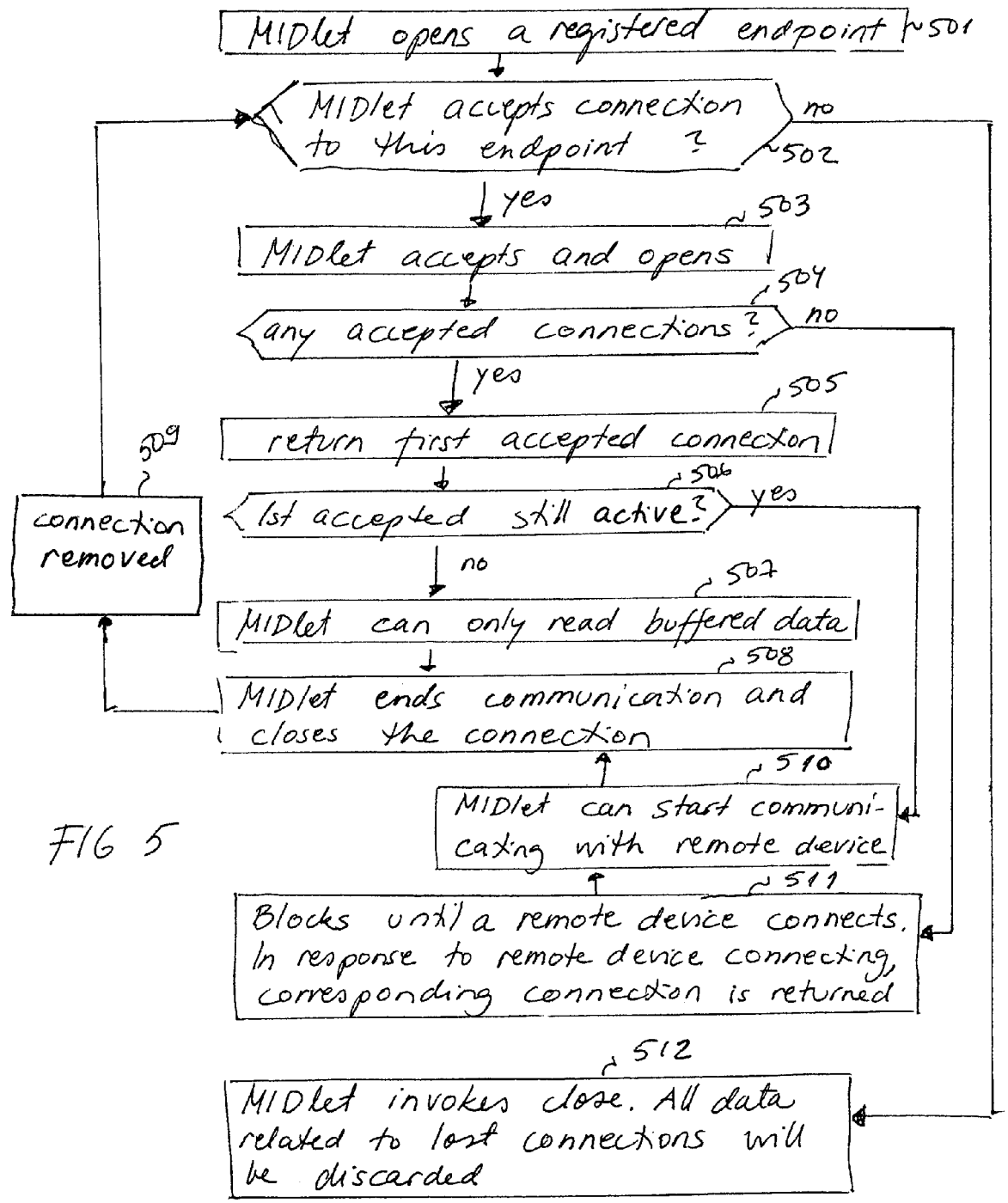
FIG. 5 is a flow chart depicting opening and closing of an accepted connection according to an embodiment of the invention.

FIG. 5 is a flow chart illustrating opening and closing of a registered Bluetooth connection to endpoint A and how a MIDlet may access all received data by looping. FIG. 5 starts when the MIDlet opens, in step 501, a registered connection by sending notifier=Connector.open( ). If the MIDlet wishes (step 502) to accept a connection to this endpoint, i.e. is willing to communicate with someone, the MIDlet accepts the connection by calling the acceptAndOpen( ) in step 503. The AMS then checks, in step 504, whether or not there are accepted connections. Accepted connections may be active connections or closed connections having buffered data. In other words, if the remote side did not send any data before disconnecting, the AMS behaves as if the push connection was not accepted.

If there are accepted connections, the first accepted connection is returned in step 505. In other words, acceptAndOpen( ) returns immediately. If the first accepted connection is no longer alive (step 506), the MIDlet may only read the buffered data in step 507. At some point the MIDlet ends the communication and closes the connection in step 508 (regardless of whether the data was read or not). In response to this, the connection is removed, in step 509, from the list of accepted connections. After closing the connection, the MIDlet returns to step 502 to decide whether or not it is willing to communicate with someone.

If the first accepted connection is still alive (step 506), the MIDlet can, in step 510, start communicating with the corresponding device including reading any buffered data received from this device. At some point the MIDlet ends the communication and closes the connection, i.e. the MIDlet proceeds to the above-described step 508.

If there are no accepted connections (step 504), the AcceptAnsOpen( ) blocks (step 511) until a remote device connects. When a remote device connects, the corresponding connection is returned and the MIDlet can start communicating with the corresponding device, i.e. it proceeds to the above-described step 510.

If the MIDlet is not willing to accept any connections (step 502), the MIDlet closes, in step 512, the endpoint by invoking close( ) on a notifier object associated with the given registered endpoint. In response to the close( ), all data related to lost connections to this registered endpoint are preferably discarded.

Figure 6:
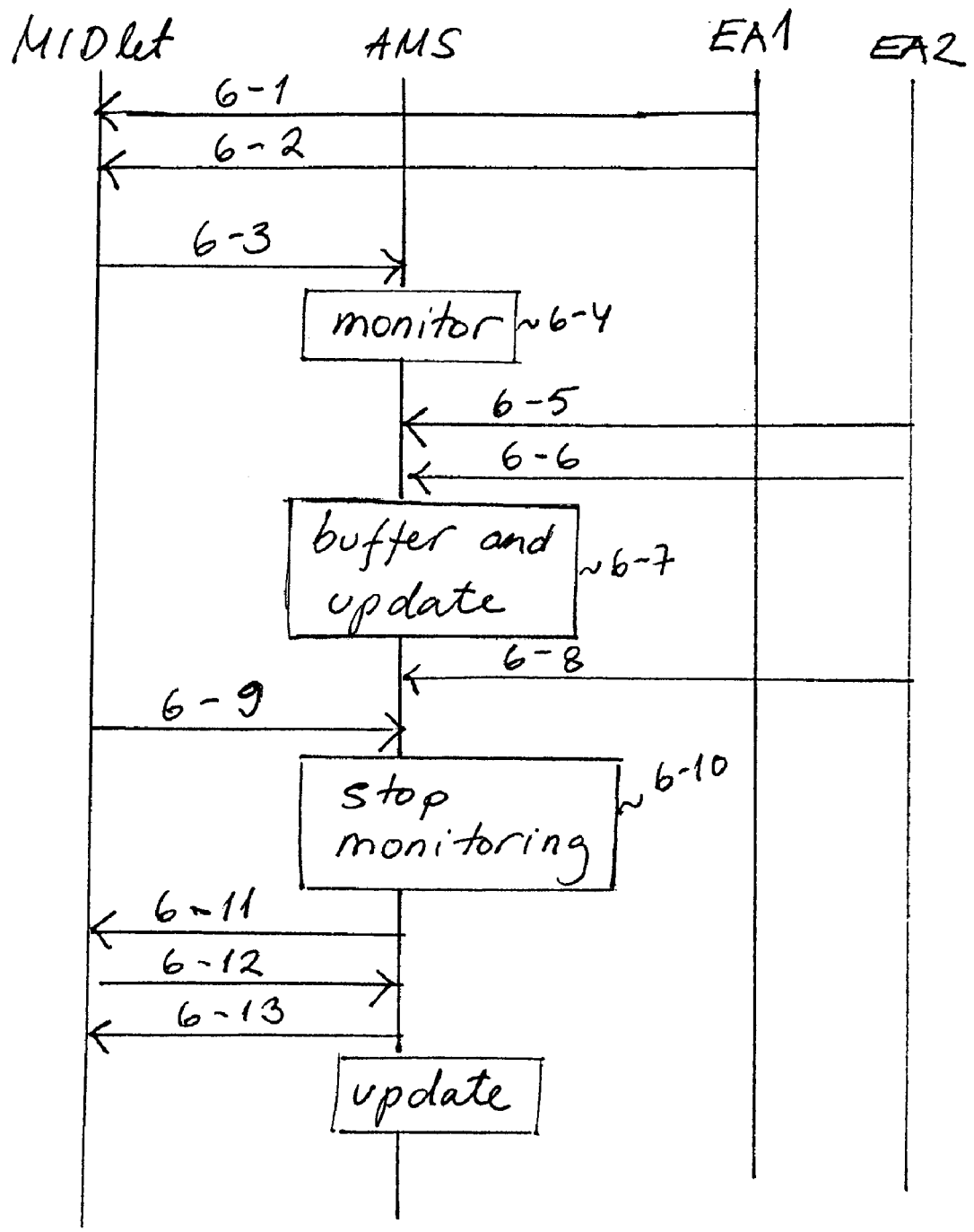
FIG. 6 is a sequence diagram illustrating functionality according to another exemplary embodiment of the invention.

FIG. 6 shows a sequence diagram illustrating an example according to another embodiment of the invention, the embodiment not being based on current MIDP. In the example of FIG. 6, it is assumed, for the sake of clarity, that inbound connections are accepted, inbound connections occur successively, and a MIDlet has registered one endpoint.

The sequence diagram of FIG. 6 starts in a situation in which the MIDlet is active (i.e. running) and receiving data (operation 6-1) from an external agent EA1. In this example, the external agent EA1 disconnects (operation 6-2). The MIDlet then, after some time or immediately, sends operation 6-3 to the AMS, operation 6-3 indicating to the AMS that the MIDlet, although running, does not wish to receive data. The reason bears no significance to the invention.

In response to operation 6-3, the AMS starts to monitor, in point 6-4, connection attempts on behalf of the MIDlet. When an external agent EA2 sends operation 6-5 (connect) to the MIDlet in order to send data, for example, the AMS accepts the connection (not shown in FIG. 6). Since the external agent EA2 assumes that the MIDlet is willing to receive data, it sends data, in operation 6-6, to the MIDlet. The AMS, according to the invention, buffers, in point 6-7, the received data and updates a list indicating inbound connections having sent data. In other words, the AMS allocates a buffer from the memory specifically for this connection and stores the data in the allocated buffer. When the external agent EA2 has nothing more to send, it disconnects (operation 6-8), (or the connection is lost due to other reasons), and the AMS continues to monitor communication events on behalf of the MIDlet.

The MIDlet then is again willing to receive data and sends operation 6-9 to the AMS. In response to this operation, the AMS stops monitoring, in point 6-10, and sends information on received data in operation 6-11. The MIDlet then wishes to read the data and sends operation 6-12 to read the buffered data. The buffered data in the corresponding buffer is read (6-13) and the AMS updates, in point 6-14, the list indicating inbound connections having sent data, i.e. it removes the connection relating to the emptied buffer from the list.

If the connection with the EA2 would have been alive when the MIDlet sent operation 6-12, the MIDlet could have started to communicate with the EA2 before or after reading the data in buffer.

In some other embodiment of the invention, the AMS may, in response to operation 6-9, i.e. instead of operation 6-11, send the received data without any request from the MIDlet.

The steps, points and operations (function calls) and related functions described above in FIGS. 2 to 6 are in no absolute chronological order, and some of the steps, and/or points, and/or carrying out operations may be performed simultaneously or in an order differing from the given one. Other functions can also be executed between the steps/points or within the steps/points. Some of the steps/points or part of the steps/points can also be omitted. Other operations can be transmitted and/or other functions/points can also be carried out between the illustrated operations. For example, depending on how the functions are divided between the AMS and the Push Registry and whether the buffers locate in the AMS or in the Push Registry, some operations, such as "clear buffers", in response to a MIDlet closing, may be sent between the AMS and the Push Registry. The operations are only examples and may also comprise other information. Furthermore, the operations may be different from the above-mentioned operations and, instead of operations, some other format may be used.

The above embodiments uses a FIFO principle, i.e. data is read in the order in which corresponding connections occurred. However, it is possible that data is read in some other order, for example the user may give the order when accepting auto-launch, or the corresponding connections may have priorities, or a LIFO (Last In First Out) principle is used. Depending on the implementation, the AMS may buffer the data in a correct order, or the application may indicate to the AMS also the buffer wherefrom the data is to be read, for example.

Although in the above, the invention is described using MIDlets as an example of an application and the AMS as an example of middleware, it is obvious for one skilled in the art that the invention is applicable to any other type of user program and middleware.

The system and devices implementing the functionality of the present invention not only comprise prior art means but also means for buffering incoming data on behalf of an application and means for simulating to the application inbound connections relating to the buffered data so that the data can be read by the application. More precisely, they comprise means for implementing an embodiment according to the present invention. All modifications and configurations required for implementing the invention may be performed as routines which may be implemented as added or updated software routines, application circuits (ASIC) and/or programmable circuits, such as EPLD (Electrically Program-

What is claimed is:

1. An apparatus supporting push technology principles, the apparatus comprising at least a processor;

a memory;

an application stored in the memory, the application having at least a first mode in which the application is configured at least to monitor inbound connections targeted to the application, and in response to detecting during monitoring an inbound connection targeted to the application, to set up a connection for the inbound connection and receive incoming data targeted to the application, and a second mode in which the application is configured at least not to receive incoming data; and middleware configured, in response to said application being in the second mode, at least to monitor inbound connections targeted to the application, and in response to detecting an inbound connection targeted to the application, to set up on behalf of said application a connection for the inbound connection towards an originator of the inbound connection, and receive and buffer said incoming data targeted to the application on behalf of said application, and in response to said application being in the first mode, not to monitor inbound connections targeted to the application.

2. The apparatus of claim 1, wherein the application is in the first mode when the application is running, and in the second mode when the application is not running.

3. The apparatus of claim 1, wherein the middleware is configured to inform the application on buffered data.

4. The apparatus of claim 1, wherein the middleware is configured to buffer the data inbound connection-specifically.

5. The apparatus of claim 1, further being configured to indicate to the application an inbound connection relating to the buffered data as an active inbound connection regardless of the state of the connection.

6. The apparatus of claim 1, the application and the middleware further being configured to perform the buffering and reading the buffers in such an order that the buffers are read in the same order in which the inbound connections occurred.

7. A computer program product embodied in a computer readable storage medium and comprising program instructions, wherein execution of said program instructions cause an apparatus containing a processor, a memory, middleware, an application stored in the memory and the computer program product stored to the memory, to:

determine whether the application is in a first mode in which the application is configured to receive data or in a second mode in which the application is configured not to receive data;

in response to the application being in the second mode, to use the middleware to monitor inbound connections targeted to the application, to set up, in response to an inbound connection, a connection towards an originator of the inbound connection on behalf of said application, and receive and buffer incoming data in a buffer on behalf of the application to which the data is targeted, and in response to the application being in the first mode, to end the use of the middleware and to let the application monitor, set up and receive inbound connections.

8. The computer program product of claim 7, wherein the execution of said program instructions further cause the apparatus to indicate a connection relating to the buffered data as an active connection to the application regardless of the state of the connection.

9. The computer program product of claim 7, wherein the middleware is further configured, in response to the application not running, to perform the receiving and buffering of said incoming data.

10. The computer program product of claim 7, wherein the execution of said program instructions further cause the apparatus, in response to the connection being disconnected, to allow the application to only perform at least one action from the following group of actions: to read the buffered data and to close the connection.

11. A communications system supporting push technology principles and comprising at least a first apparatus comprising a processor, a memory and an application stored in the memory, the application having at least a first mode in which the application is configured at least to monitor inbound connections, set up a connection for a detected inbound connection, and receive incoming data targeted to the application and a second mode in which the application is configured at least not to monitor, set up and receive incoming data; and a second apparatus comprising a processor, a memory and an agent stored in the memory for sending data to the application over a connection;

wherein the first apparatus comprises middleware configured to monitor inbound connections, set up a connection for a detected inbound connection and buffer data on behalf of the application, to detect that the application is again in the first mode, and to allow the application to receive the buffered data when the application is again in the first mode, wherein the first apparatus is configured to use for new inbound connections the middleware in response to the application being in the second mode and not to use for new inbound connections the middleware in response to the application being in the first mode.

12. The communications system of claim 11, wherein the first apparatus is capable of receiving data simultaneously over at least one connection from at least one second apparatus and the middleware is configured to buffer incoming data in an order in which the connections occur and to allow the application to read data in an order in which the data was buffered.

13. The communications system of claim 11, wherein the connection is based on Bluetooth, the first apparatus comprises a Java runtime environment based on a mobile information apparatus profile comprising an application management system, and the middleware is configured to be part of the application management system.

14. The communications system of claim 11, wherein the first apparatus and the second apparatus are integrated into one apparatus and the connection is an internal connection.

15. A method comprising at least:
receiving a first indication that an application is in a first mode in which the application is configured not to receive data;
starting, in response to the first indication, to monitor inbound connections targeted to the application on behalf of the application;
detecting, during monitoring, incoming data targeted to the application;
indicating, in response to the detecting, on behalf of the application, to a sender of the data that the application is receiving the data;
setting up, in response to the detecting, a connection towards the sender on behalf of the application to receive the data;
receiving and buffering the data on behalf of the application;
receiving a second indication that the application is in a second mode in which the application is configured to receive data;
allowing, in response to receiving the second indication after the buffering of the data started, the application to receive the buffered data; and
ending, in response to the second indication, monitoring inbound connections targeted to the application on behalf of the application.

16. The method of claim 15, further comprising buffering data inbound connection-specifically.

17. The method of claim 15, wherein the buffering is performed when the application is not running.

18. The method of claim 15, further comprising clearing the buffers in response to an event from the following group of events: disapproving auto-launch of the application, closing the application before the buffered data is read, uninstalling the application, and disabling the support for push technology principles.

* * * * *